Nov. 17, 1942. O. STEINER 2,302,584
COMBINED RANGE AND VIEW FINDER HAVING PARALLAX CORRECTING MEANS
Filed March 27, 1940 7 Sheets-Sheet 1

INVENTOR.
Oscar Steiner

Nov. 17, 1942.  O. STEINER  2,302,584
COMBINED RANGE AND VIEW FINDER HAVING PARALLAX CORRECTING MEANS
Filed March 27, 1940  7 Sheets-Sheet 3

INVENTOR.
Oscar Steiner

Nov. 17, 1942.   O. STEINER   2,302,584
COMBINED RANGE AND VIEW FINDER HAVING PARALLAX CORRECTING MEANS
Filed March 27, 1940   7 Sheets-Sheet 4

INVENTOR.
Oscar Steiner

Nov. 17, 1942.         O. STEINER         2,302,584
COMBINED RANGE AND VIEW FINDER HAVING PARALLAX CORRECTING MEANS
Filed March 27, 1940          7 Sheets-Sheet 5

INVENTOR.
Oscar Steiner
BY
his ATTORNEYS

Nov. 17, 1942.    O. STEINER    2,302,584
COMBINED RANGE AND VIEW FINDER HAVING PARALLAX CORRECTING MEANS
Filed March 27, 1940    7 Sheets-Sheet 7

INVENTOR.
Oscar Steiner
BY
his ATTORNEYS

Patented Nov. 17, 1942

2,302,584

UNITED STATES PATENT OFFICE 2,302,584

COMBINED RANGE AND VIEW FINDER HAVING PARALLAX CORRECTING MEANS

Oscar Steiner, Irondequoit, N. Y., assignor to The Folmer Graflex Corporation, Rochester, N. Y., a corporation of Delaware Application March 27, 1940, Serial No. 326,200

32 Claims. (Cl. 95—44)

This invention relates to a combination range and view finder especially adapted to cameras of the folding type, but which may be adapted or applied to any type of camera.

In order that the principle of the invention may be readily understood, I have disclosed a single embodiment thereof in the accompanying drawings, wherein—

Fig. 7 is a top plan view of the combination range and view-finder mechanism, showing the telescoping eye-piece extended and parts of the camera cut away more clearly to show the construction of details, the camera being shown as adjusted for making a photograph at ten feet, using a medium focal-length lens;

An important object of this invention is to provide a combination range and view finder having means for correcting for parallax. Other objects thereof are to provide a combined range finder and view finder having means for adapting the negative view finding lens so as to include only the field to be covered by a definite objective lens that is used in making the photograph; to provide a combination range and view finder that will produce an unusually brilliant image when used as a view finder; to provide a combined range and view finder which can be quickly adapted to track or synchronize with lenses of several different focal lengths; to provide a range finder having a movable mirror mounted on ball bearings, which is self-aligning and requires no adjustment; to provide a combined range and view finder having a balance-spring loading arrangement, thereby assuring a minimum of lost motion in the several connecting links for operating the range finder; and to provide image alignment means in the mounting of one of the negative lenses. Other objects of the invention will be evident from the detailed description.

Without first describing the general structure of the camera, since that can obviously be widely varied, I will proceed at once with the description of the combined range and view finder and the parts immediately cooperating therewith, and will at a subsequent point in the specification describe the general structural features of the camera to which my invention in here shown and applied, but to which my invention is in no wise limited.

Figures 1, 2, 3:
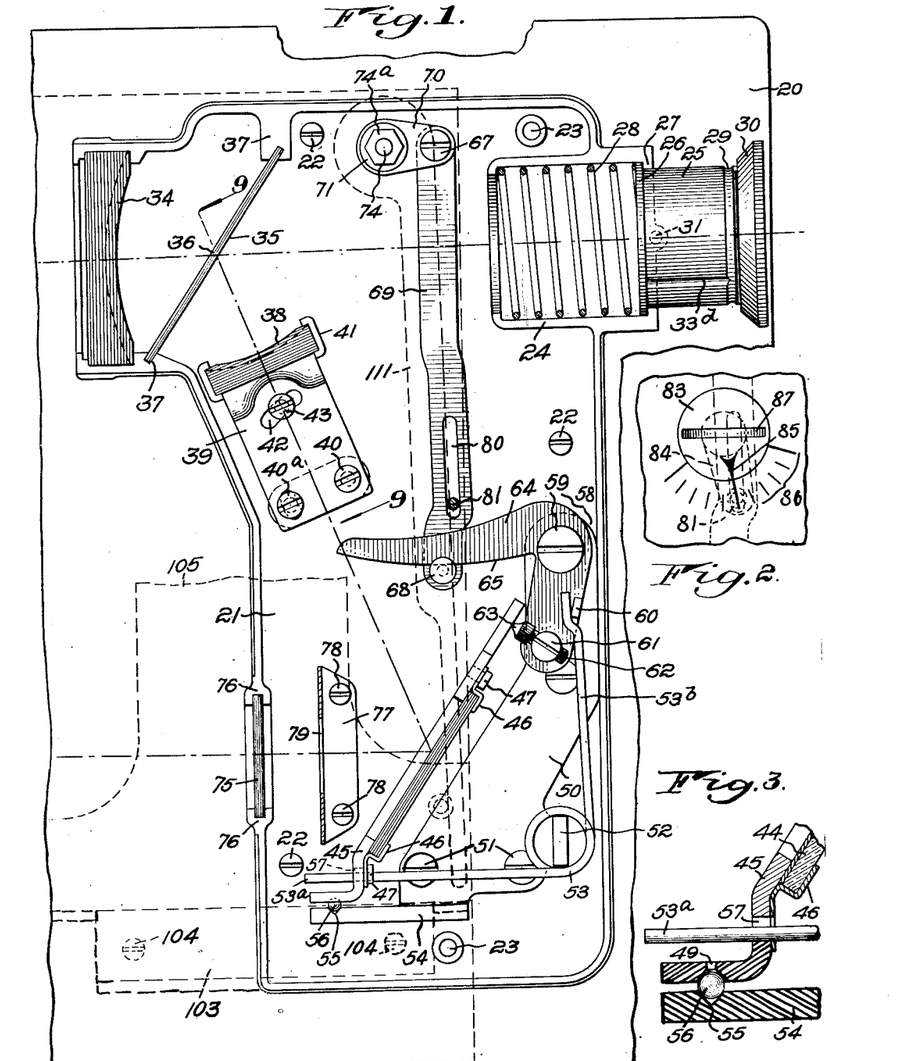
Fig. 1 is a top plan view of the combination range and view finder with the cover removed and showing the relation of the various parts when the range finder is adjusted for a medium focal-length lens and the camera objective is at infinity.
Fig. 2 is a fragmentary detail of the means for adjusting the range finder synchronizing mechanism, which is shown as adjusted for a medium focal-length lens in the position shown in Fig. 1.
Fig. 3 is a fragmentary, vertical section showing the mounting of the mirror frame and its ball bearing support.
Figure 2:
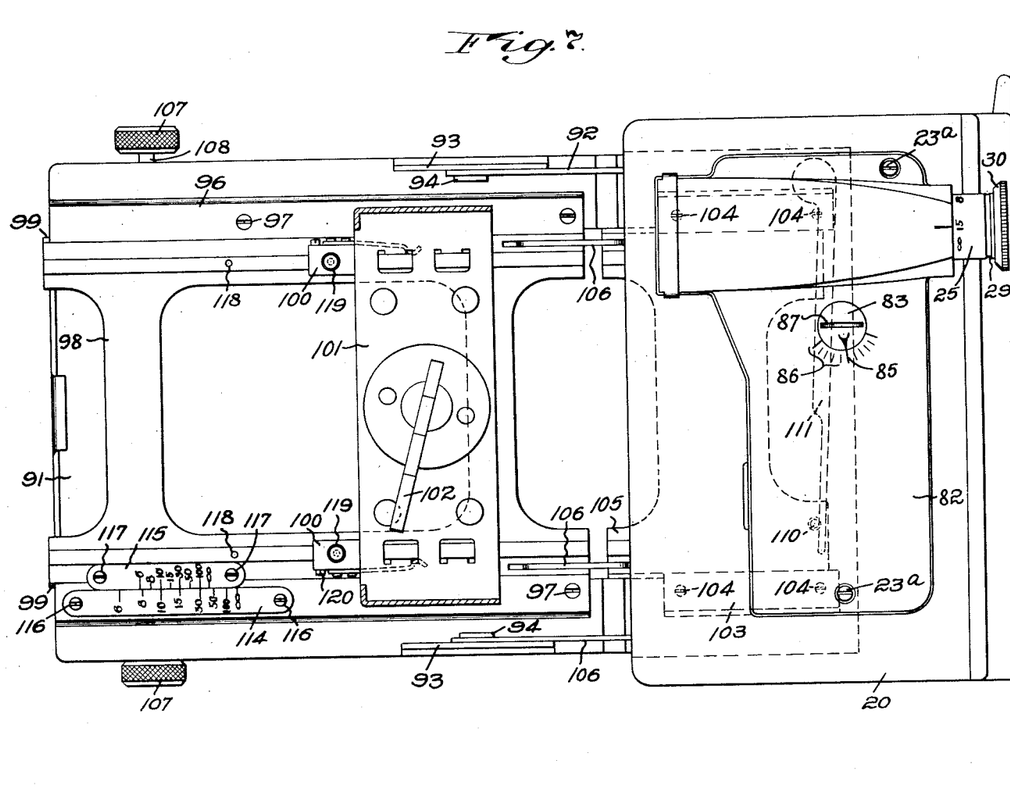
Figure 4:
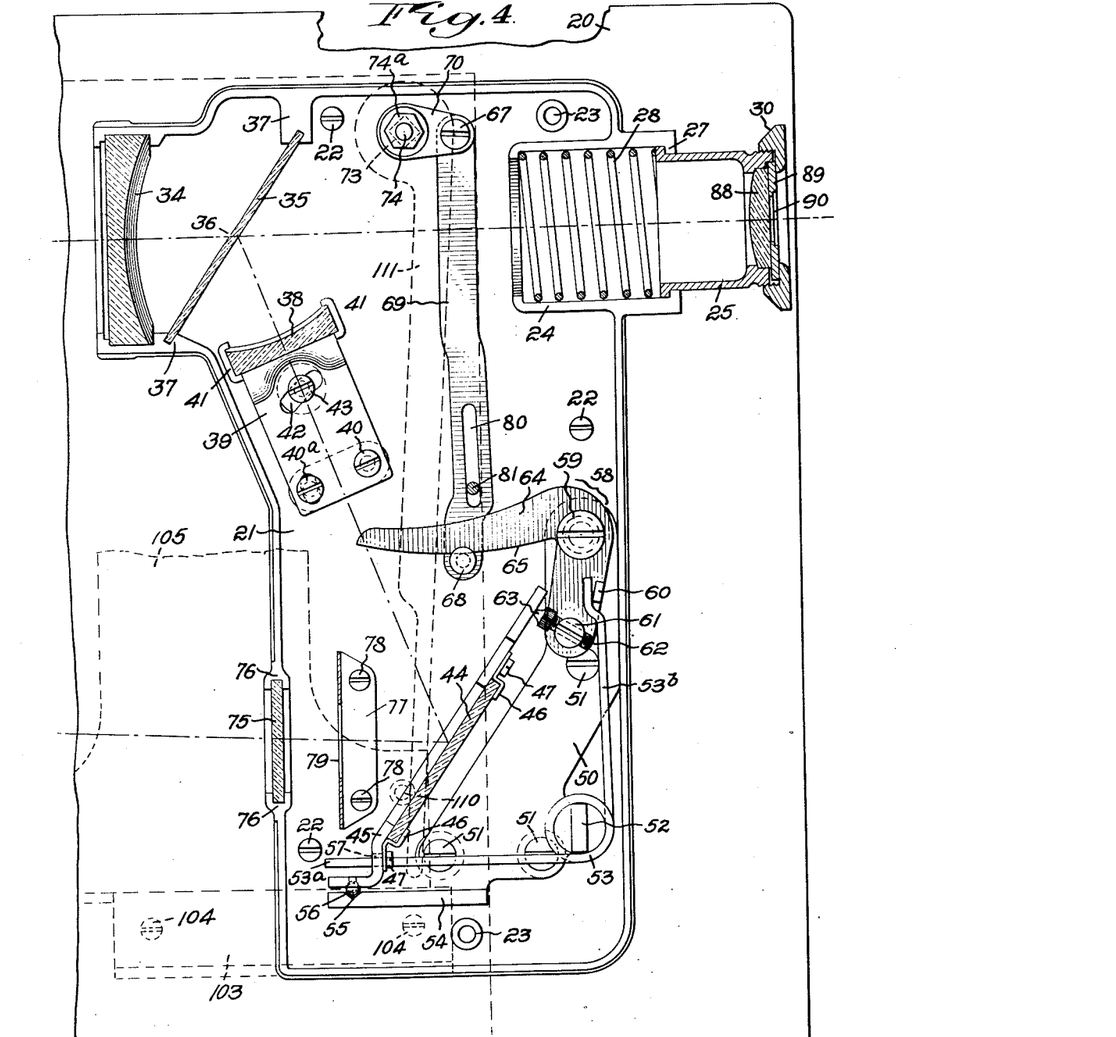
Fig. 4 is a view similar to Fig. 1, but with parts in section, the camera objective lens having been moved forward to focus onto an object at a distance less than infinity.
Figures 5, 6, 16:
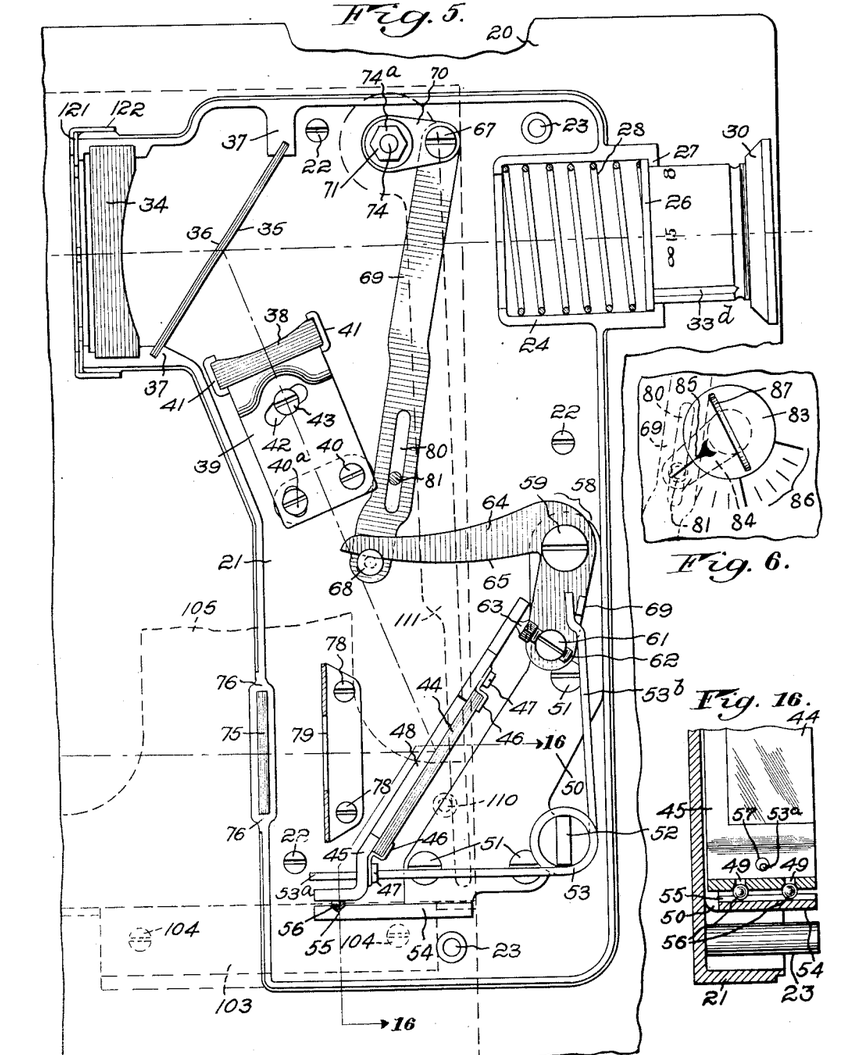
Fig. 5 is a view similar to Fig. 1, but with the range finder adjusted to track with a lens of relatively long focal length, the range finder mechanism being in infinity position.
Fig. 6 is a fragmentary detail of the tracking adjusting mechanism positioned as in Fig. 5.
Fig. 16 is a sectional detail on the line 16—16 of Fig. 5.
Figures 12, 13, 14, 15:
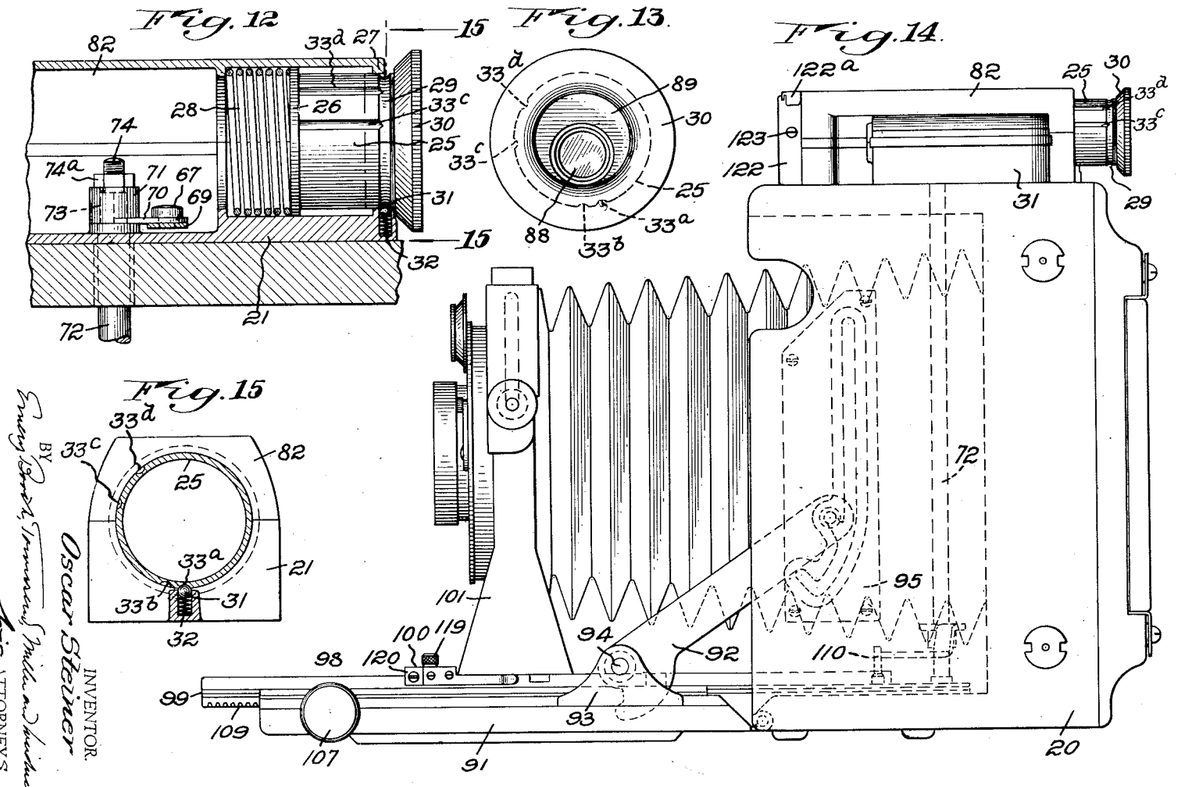
Fig. 12 is a fragmentary detail in vertical section, showing the construction of the telescoping and infinity correcting eye-piece.
Fig. 13 is a rear elevation of the eye-piece.
Fig. 14 is a side elevation of a camera, showing the combination range and view finder mounted on said camera.
Fig. 15 is a vertical section through Fig. 12 on the line 15—15 thereof.

I will first refer to Figs. 1, 4 and 5, making reference for certain details of construction to Figs. 12, 13 and 15.

The camera box or casing is indicated generally at 20 in the several figures, and it has a range finder and view-finder housing 21 attached to the top thereof by means of screws 22, 22. While the combined range finder and view finder is desirably placed on the top of the camera and is here so shown, it is to be understood that it can be placed at either side or at the bottom thereof, and that the combined range and view finder could be built into the camera box itself, the disclosed embodiment being particularly adapted for such type of cameras.

The range finder and view-finder housing 21 is provided with threaded studs 23, 23 to which the range-finder cover (omitted from Figs. 1, 4 and 5) is attached. The said housing 21 is provided with a cylindrical or barrel-shaped opening 24 into which is fitted an eye-piece barrel 25, the forward motion of which eye-piece barrel is limited by a flange 26 of the barrel 25 engaging a lip 27 of the range finder and view-finder housing 21 A coiled spring 28 causes the eye-piece barrel 25 to be thrust outwardly as shown in said Figs. 1, 4 and 5. The barrel 25 is also provided with an encircling groove 29 and a threaded eye-piece 30 screwed into the barrel. When the said eye-piece 30 is pushed inward, a ball 31, shown in dotted lines, engages the said groove 29, holding the eye-piece assembly in the compacted or collapsed condition shown in Fig. 12. The ball 31 is caused to engage the groove 29 under the influence of a coiled spring 32 fitted into an opening provided in the housing 21. The eye-piece barrel 25 is also provided with lengthwise extending grooves 33a, 33b, 33c and 33d, distributed circumferentially about said barrel, as shown in Figs. 12, 13 and 15, and the purpose of which will be fully described hereinafter.

The range finder is, as shown best in Figs. 1, 4 and 5, provided with a negative lens 34 held in place in slots provided in the housing 21. The range finder is also equipped with a glass plate 35, separately shown in Fig. 10, and of which glass plate a small, preferably central solid portion or area 36, shown as rectangular but which may be of any suitable outline, is coated with reflecting material in such a manner that the said central portion or area 36 both reflects light beams and transmits light beams. This renders the said portion or area 36 a second surface-mirror. The said glass plate 35 is supported in grooves 37, 37.

Figure 9:
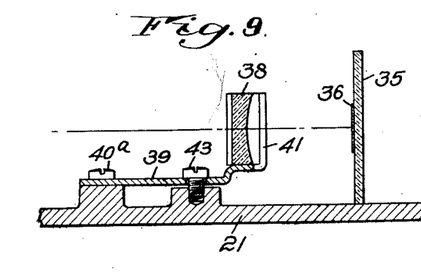
Fig. 9 is a detail in vertical section on the line 9—9 of Fig. 1, of the adjustable negative lens mounting.

The range finder is also equipped with a second negative lens 38 carried by a bracket 39 attached to the rangefinder housing 21 by means of screws 40, 40a. The bracket for the negative lens 38 is provided with channel members 41, 41, for retaining the said negative lens in position. The bracket 39 is also provided with an arcuate slot 42 through which passes an adjusting screw 43. The hole through which the screw 40a passes is slightly elongated as shown, so that the said lens bracket 39 can be turned slightly about the screw 40 as a pivot and then clamped in place by means of the screw 40a. The negative lens 38 is adjustable in a direction lengthwise the housing 21 by means of the said screw 43, which is also shown in Fig. 9. The described construction provides ready means for adjusting the image as viewed through the mirror area 36, and the image as reflected from the said mirror area 36, so that they coincide when the range finder is properly adjusted.

I also provide as another optical element of the combined view and range finder a second mirror 44, shown in side elevation in Figs. 1, 4 and 5, and in partial detail in Figs. 3 and 16.

The said mirror 44 is a totally reflecting mirror of the first surface type. It is carried by a mirror-support plate 45 and is held thereto by means of clips 46, 46, themselves held to the mirror-support plate 45 by screws 47, 47. The said support plate 45 is provided with an opening 48 to allow light beams to strike the face of the mirror 44. The said support plate 45 is provided with two countersunk holes 49, 49 suitably spaced laterally, as shown most clearly in Fig. 16, one of such holes being shown in Fig. 3.

The range finder and view-finder housing 21 is provided with a mechanism-supporting bracket 50, most clearly shown in Figs. 1, 4 and 5, it being attached to the housing 21 by screws 51, 51. The said bracket 50 is provided with an upturned lip, member or formation 52 to retain in position the mirror spring 53, which is of an elongated form having arms 53a and 53b at substantially right angles to each other, the central coiled portion of said spring surrounding the said member, lip or formation 52. The said mechanism-supporting bracket 50 is also provided with an upturned end or flange 54 having a transverse V-shaped groove 55, shown in section in Fig. 3 and in lengthwise extent in Fig. 16. In each of said countersunk holes 49 rides a ball 56, and both of said balls are received in the groove 55. Said balls provide a ball-bearing hinge for the mirror-support plate 45, which is caused or tends to move or turn in a clockwise direction viewing said Figs. 1, 3, 4 and 5, under the influence of said spring arm 53a. The said spring arm 53a extends through a hole 57 of the mirror bracket 45, as best shown in Fig. 3.

The said mechanism bracket 50 is provided with a boss (not shown) to which is attached a bell-crank lever 58 by means of a shoulder screw 59. The said bell-crank lever 58 is provided with an upturned lip 60 at an edge of one arm thereof, which is engaged by the said spring arm 53b of the spring 53, so that the said bell-crank lever 58 is caused to be turned in a contraclockwise direction under the influence of the said spring arm 53b. The said bell-crank lever 58 is provided with a stud or screw 61 having a transverse threaded hole therein into which an adjusting screw 62 is threaded, the said screw having a rounded cone point 63 to engage the back face of the mirror-support plate 45. The said bell-crank lever 58 is also provided with an arm 64, shown as laterally extending in Figs. 1, 4 and 5, and which has a face or edge 65 machined in a radius with respect to the center of a shoulder screw 67 at the upper end of a link or member to be referred to, when all the mechanism is adjusted for the infinity position. Riding upon the said face or edge 65 of the said arm 64 is a stud 68 provided with a groove indicated in dotted lines, to engage the said face or edge 65. The said stud 68 is attached to a long link or member 69 attached in turn to a crank arm 70 by means of the said shoulder screw 67. The said crank arm 70 is provided with a hub 71 and is attached to a short shaft 72 extending through a wall of the camera case 20, as indicated on a larger scale in Fig. 12, and which has a squared end 73, indicated in Figs. 4 and 12, the said squared end 73 being held to the shaft 72 by a nut 74a threaded onto the extended portion 74 of the said shaft 72.

The range finder and view-finder housing 21 is also provided with a second window 75, which is a flat piece of clear glass fitting into grooves 76, 76 of the housing. Behind the window 75 is a light-baffle 77 attached to the said housing by screws 78, 78. The said light-baffle 77 is provided with a central opening 79 to allow the light beams to pass through the window 75 to the mirror 44.

The link or member 69, referred to as carrying the stud 68 to engage the face or edge 65 of the bell-crank lever-arm 64, is itself provided with a lengthwise extending slot 80 in which rides a pin 81, as shown in Figs. 1, 4 and 5. To the range finder and view-finder housing 21 is suitably attached a cover 82, best shown in Fig. 7, and to said cover is attached a disk or dial 83 having a connected crank arm 84, best shown in Figs. 2 and 6, the said disk or dial 83 having a short inwardly extending shaft to which the said crank arm 84 is directly connected as indicated in Figs. 2 and 6. To the said crank arm 84 is attached the pin 81 previously referred to as received in the lengthwise extending slot 80 of the link or member 69.

If the disk or dial 83 is turned either in a clockwise or in a contraclockwise direction, the position of the said link 69 will be changed and thus the stud 68 will be moved along the face or edge 65 of the lever arm 64, depending, of course, upon the direction of turning movement and the extent of movement of the disk or dial 83. In Fig. 2, the said disk or dial 83 is represented as having been turned slightly in a contraclockwise direction, thus moving the said link or member 69 to the right viewing Figs. 1 or 4. In Fig. 6, however, the disk or dial 83 is represented as having been turned in a clockwise direction, thus moving the link or member 69 to the left, as shown in Fig. 5. The said disk or dial 83 is provided with an index mark 85 and the housing cover 82 is provided with a graduated scale 86, which can be made to read in focal length of the objective lens used or which may be arbitrary. The said disk or dial 83 is also provided with a transverse slot 87 into which the edge of a coin or any other suitable thin edged article can be used for turning the disk 83, if a screwdriver is not readily accessible.

In Fig. 4, the eye-piece barrel 25 and the eye-piece 30 are shown in section, so that the relative positions of the positive lens 88 and the lens diaphragm washer 89 clearly appear. Connected to the eye-piece 30 is the diaphragm washer 89 having an opening 90 that is offset from the axial center of the said diaphragm washer and of the positive lens 88. The said eye-piece 30 is shown in Fig. 4 as adjusted for the fifteen foot position. The several notches 33a, 33b, 33c and 33d, previously referred to and shown in Figs. 13 and 15, are distributed about the circumference of the barrel 25, and will be engaged by the spring-pressed positioning-ball 31, according to the adjusted position of the diaphragm opening 90, the eccentric or off-center position of which is clearly indicated in Fig. 13. This construction provides means for correcting the view finder for parallax at the several selected positions, which in this particular case are six feet, eight feet, fifteen feet and infinity. Obviously other distances may be provided for by providing other notches than the notches 33a, etc., here shown.

In Fig. 15 the barrel 25 is shown in cross section as so positioned that the spring-pressed ball 31 engages the notch 33a. This is the infinity position of the eye-piece 30. By turning the eye-piece 30, the diaphragm washer 89 is also turned, and since the opening 90 in the diaphragm washer 89 is off-set, it is possible to select any one of a number of positions for sighting through the positive lens 88. This provides therefore for correcting for parallax with respect to the view finder position in its relation to the center axis of the photographic objective. As the combined range and view finder is herein constructed, the center line of the eye-piece barrel 25 is to the right of the center line of the negative lens 34. This position corresponds to the fifteen foot distance when the diaphragm opening 90 is in the position shown in Fig. 13.

It is desirable to position the range-finder mechanism parts when at infinity, as shown in Fig. 1, so that if a line were drawn through the center of the ball bearings 56 and aligning with the face of the mirror 44 (that is, with the back face of the mirror support 45) and such line touches the point of the cone 63, such line will intersect the center of the pivotal screw 59 of the bell-crank lever 58. Also a radius struck from the center of the screw 67 to which the link or member 69 is connected, and the arc drawn on which radius forms the face or edge 65 of the lever arm 64, such arc or radius would also intersect the pivotal screw 59 when the mechanism is adjusted for the infinity position. This is a preferred arrangement, but obviously the invention is not limited to the specific or exact position of any of the said cooperating elements, since it may be desirable, for various reasons, to shift slightly one or more of the said positions within the scope of the invention.

I will now refer to the general structure of the camera and for that purpose will refer mainly to Figs. 7, 8, 11 and 14. In Fig. 7, the combination range and view finder is shown as mounted upon (that is, as secured to the top of) the camera box 20. While the camera and the box therefor may be of any suitable type, it is herein represented as having the structure shown in my co-pending application Ser. No. 309,385, filed December 15, 1939. However, it is to be understood that the range finder is applicable to almost any type of folding camera with slight modification of the connecting linkage. I will describe, without in any way limiting myself thereto, the structure of the camera herein shown as having the combined range and view finder connected to the top thereof.

Figure 8:
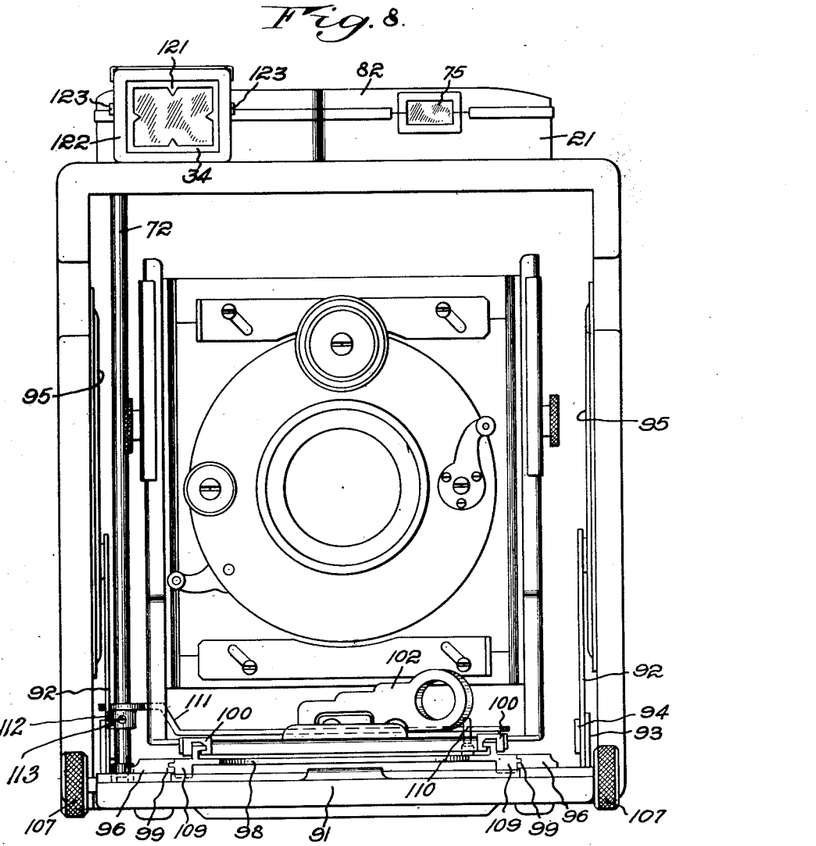
Fig. 8 is a front elevation of a camera with the combination range and view finder attached thereto and showing the masking device.

In Fig. 7, the cover 82 of the housing 21 is represented as held to the housing by screws 23a, 23a, engaging the studs 23, 23 of said housing 21, shown in Figs. 1, 4 and 5. The camera is provided with the usual camera bed 91 held in position by side arms 92, 92, attached to the camera-bed ears 93, 93 by shoulder rivets 94, 94. The other ends of the side arms 92, 92 are attached to the side-arm plates 95, 95, as shown in dotted lines in Fig. 14. The camera bed 91 is also attached to the bottom of the camera box or casing 20 by means of a hinge (not shown) and is provided with track-guide rails 96, 96, held to the camera bed by screws 97, 97, indicated in Fig. 7. Into grooves in the guide rails 96, 96, as shown in Figs. 7 and 8, is fitted a track 98 provided with tongues 99, 99, to engage the guide rails 96, 96, as best shown in Fig. 8. The said track 98 is also provided with infinity stop blocks 100, 100 for limiting the motion of the camera-front member that is indicated generally at 101.

The said camera front member or structure 101 is preferably the same as that disclosed in my said co-pending application Ser. No. 309,385, filed December 15, 1939, and therefore needs no further description excepting to state it is important the camera-front member 101 be positioned on the track 98 in a definite position. In the present disclosure the infinity stops 100, 100 serve this purpose, because the camera-front member 101 engages the infinity stops 100, 100 and is clamped in position on the track 98 by clamping mechanism actuated by the camera-front locking lever 102.

Within the camera box itself, as shown in dotted lines in Fig. 7, are provided two short track rails 103, 103 held to the camera box or casing 20 by screws 104, 104. The camera track has a section 105 engaged by the guide rails 103, 103 in a manner similar to that provided for by the track 98. The said track section 105 is connected to the main portion 98 of the track by means of connecting links 106, 106. Thus any movement imparted to the track 98 by the act of turning focusing knobs 107, 107 (attached to shaft 108, having pinions, not shown, for meshing with racks 109, 109, shown in Figs. 8 and 14) will be transmitted to the track section 105, thus causing it always to travel with the main track 98. The said track section 105 is provided with a pin 110 to engage the arm 111, shown in dotted lines in Figs. 4, 7 and 11 and in full lines in Fig. 8. The said arm 111 has a hub 112, shown in Fig. 8 as held to the shaft 72 by locking screw 113.

Figure 11:
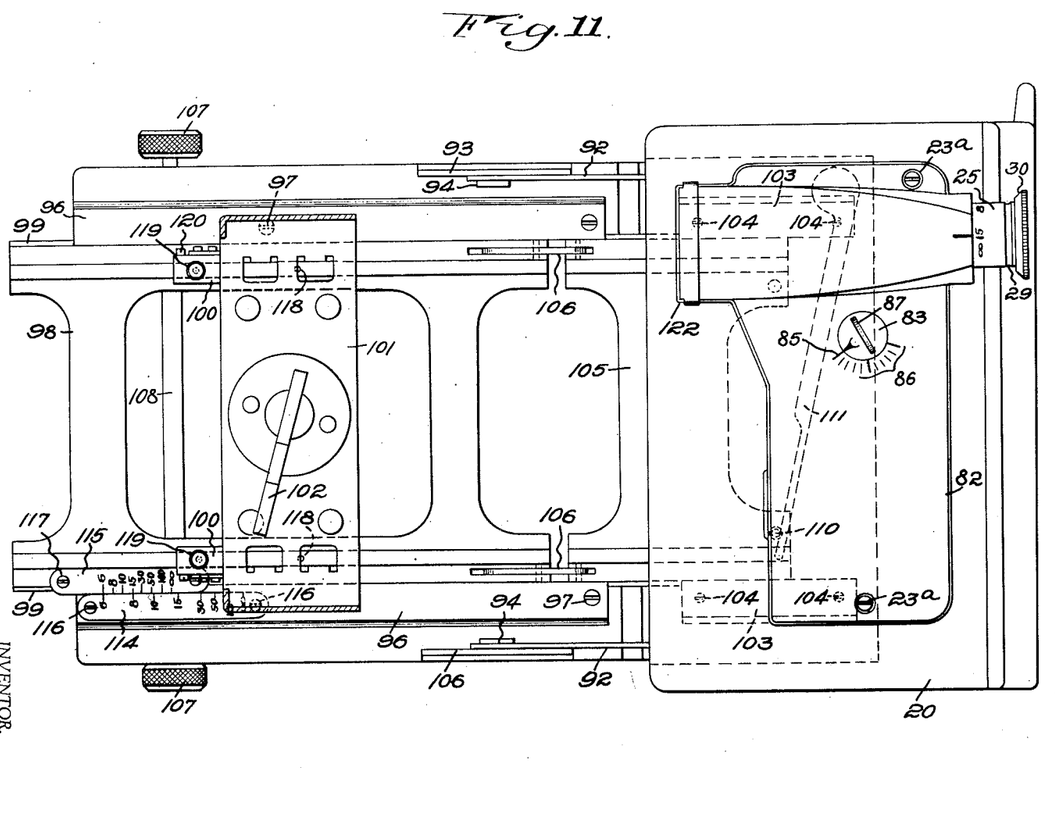
Fig. 11 is a top plan view similar to Fig. 7, but with the camera shown adjusted for six feet, a relatively long focal length lens being used.

The camera is provided with focusing scales 114, 115, best shown in Figs. 7 and 11. The focusing scale 114 is attached to a guide rail 96 by a screw 116, 116, and the focusing scale 115 is attached to the camera track 98 by screws 117, 117. In Fig. 7 the said focusing scales are shown as they will appear when the camera is adjusted for photographing at a position of ten feet, and in Fig. 11 the said focusing scales are shown as adjusted for a position of six feet. The range finder mechanism will be in the position shown in Fig. 4 and the track 98 will be in the position shown in Fig. 7, these positions corresponding to a focusing position of ten feet. If the track 98 were moved out to the six foot position, the mark 6 on the scale 114 would then coincide with the mark 6 on the scale 115, and the mirror 44, shown in Figs. 1, 4 and 5, would be caused to rock in a clockwise direction, inasmuch as the pin 110 that engages the arm 111 would also be moved forward and the arm 111 would follow the pin 110 under the influence of the spring 53, so that the mirror 44 would be in the position shown in Fig. 4, wherein the link or member 69 appears to the right of its position as shown in Figs. 1 and 5. The angular differences in the position of the said mirror 44 in Figs. 1, 4 and 5 are so slight, however, as not to be observable in these drawings.

Inasmuch as the shaft 72 is attached to the follower arm 111, the crank arm 70 attached to said shaft will turn in a clockwise direction. The said arm 111 follows the pin 110 because the crank arm 70 is connected to the link or member 69 by the shoulder screw 67, and the said link or member 69 is provided with the stud 68 engaging, as described, the face or edge 65 of the bell-crank arm 64. Inasmuch as the said arm 64 tends to move in a contraclockwise direction under the influence of the arm 53b of the spring 53, the said arm 111 always follows the pin 110. The mirror-support frame 45 is caused to follow the point of the cone 63 of the screw 62 under the influence of the said spring arm 53a of the spring 53, thus causing the mirror-support frame 45 to rock on the ball bearings 56. Thus any motion of the track 98 will be transmitted to the track 105 by means of the links 106, 106 and the motion will be transmitted to pin 110, arm 111 and shaft 72.

Thus the range-finder mirror 44 will be caused to rock slightly either in a clockwise or a contraclockwise direction depending on the direction of movement of track 98. When the said track 98 is moved in an outward direction in order to focus on objects at a near distance, the said mirror 44 will be caused to rock slightly in a clockwise direction, thus causing objects at a near distance to be reflected by the mirror 44 through negative lens 38 onto the mirror spot or area 36 of the glass plate 35, and when the track 98 is moved inwardly (that is, toward the infinity position) the mirror 44 will be caused to rock in a contraclockwise direction, thus reflecting the image at a much greater distance. By this means the range finder will cause the images, as respectively received through the lens 34 and the window 75, to converge, and the mechanism is so adjusted that the images on the mirror spot or area 36 of the glass plate 35 will always merge at any distance for which the camera objective lens is focused.

In combination range finder and view finders heretofore manufactured, so far as I am aware, glass plates corresponding in general purpose to the plate 35 herein shown have been coated over the entire surface thereof with a reflecting substance in such manner that said entire area would both reflect and transmit light. Thus, in the prior art constructions any light passing through a lens such as 34 was partially filtered out or blocked by reason of the fact that the mirror had its entire area so coated as to reflect and also to transmit light, and the result was a considerable loss in brilliancy in the view finder.

Figure 10:
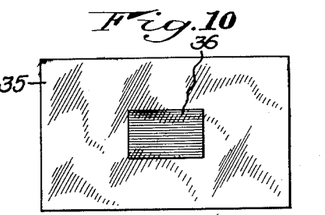
Fig. 10 is an elevation of the mirror-supporting glass, showing the position of the central semi-transparent mirror area.

In my present invention, however, only a small and preferably central portion or area of the glass plate 35 is treated so as to form a semi-transparent mirror, the rest of the said glass plate being clear and transmitting light unimpaired. The glass plate 35 having the reflecting spot or area 36, which is best shown in Fig. 10, allows practically all the light that passes through the negative lens 34 to reach the positive lens 88, best shown in Fig. 4 (excepting the small central spot or area 36). There is thus provided an image of much greater brilliancy than is provided in any other view finder of which I am aware. The said novel construction renders range finding a much simpler operation than heretofore, since, when using the structure as a range finder, the entire object as viewed through the negative lens 34 can be seen, and the particular part of that object on which it is desired to focus is then centered on the mirror spot or area 36, and the images are made to coincide when the camera is properly adjusted for any given distance. In the usual range finder of the coincident type, only a very small opening is provided at the place where I now provide the negative lens 34, and the result therefore has been that the range finder was necessarily compelled to be pointed quite accurately at the particular object to be focused upon, and considerable time was lost in finding such position. In the practice of my herein disclosed invention, this is not the case because the range finder and the view finder constitute a single structure, and before making a picture with a camera having a view finder, it is usual to select definitely the area to be photographed. Moreover, it is considerably easier to pick out in the area outlined by the view finder the central or most important object to be photographed. Therefore, it is a simple matter to select the proper object on which to focus.

One of the serious objections to combination range and view finders as heretofore constructed has been the loss of illumination through the view finder, thus cutting down the brilliancy of the image considerably. I have by my present invention eliminated this and the other disadvantages I have referred to and I have thereby provided a range finder that is much easier to operate.

I have in the foregoing description explained how the range finder operates when a photographic objective of one focal length is used. By my present invention, I have provided for causing the range finder to track with lenses of widely different focal lengths, and I will now explain the very simple means by which an adjustment of the range finder can be made by the operator so as to cause the range finder to track with lenses of other focal lengths.

It will be readily apparent that it is important that any such adjustment should be one that can be made quickly and by a person not necessarily schooled in the art of range finder construction.

It is now common practice in the photographic art to have a camera equipped with a plurality of lenses of different focal lengths. It is also desirable to change from a lens of one focal length to one of another focal length, and to have the range finder track with such different lenses. It is also very important to provide quick acting, easy means for making the adjustment. All this my invention provides for, as will now be described.

It has already been pointed out that to the mechanism cover 82 is attached the disk or dial 83 controlling the pin 81 in the slot 80 of the link or member 69. In Fig. 2, the index pointer on the disk dial 85 points to a graduation of scale 86 that represents a lens of medium focal length for the camera herein disclosed, and which focal length would be approximately five inches. The said link or member 69 will in such case be positioned as shown in Fig. 1. If, now, the disk or dial 83 is turned in a contraclockwise direction, the said link or member 69 will be moved to the right viewing Fig. 1, and the stud 68 will then move along the face or edge 65 of the lever arm 64 to a point positioned along the said face or edge 65 depending upon how far the disk or dial 83 is moved. The further to the right viewing Fig. 1 the said stud 68 is positioned along the face or edge 65 of the lever arm 64, the smaller will be the ratio of movement of the camera track with respect to the movement of the mirror support 45. The further to the left the stud 68 is moved along the face or edge 65 of the lever arm 64, the greater will be the ratio of movement of the track with respect to the said mirror support 45.

It will thus be understood that the present invention provides means for readily adapting the camera and the combined view and range finder to lenses of various focal lengths.

Since with a short focal length lens, as, for example, one of a five inch focal length, the adjustment from a six foot position to infinity will be much less than the adjustment which is necessary with a long focal length lens, as, for example, a seven inch lens, it is necessary to provide means to change the ratio of movement of the camera track 98 with respect to the movement of the mirror support 45, inasmuch as the movement of mirror 44 will always be the same regardless of focal lengths. That is to say, the movement necessary to bring both images together on the mirror spot or area 36 of the glass plate 35 will be the same when working between the distance of six feet and infinity regardless of the focal length of the lens. As just pointed out, however, this will not be true with respect to the movement of the photographic objective, as the longer lenses will require a greater movement of the camera track than the shorter lenses.

The scale 86 shown in Figs. 2, 6 and 7 has been provided with arbitrary markings, but the markings may be for any particular lens that might be used in connection with the disclosed range and view finder.

It will be understood that as different focal length lenses are used, the position of the camera front 101 with respect to the camera track 98 will vary with lenses of different focal length. It will therefore be necessary in the use of the camera to adjust the infinity stops 100, 100 to a position that will coincide with or correspond to the lens used.

In order to enable the operator quickly to make the necessary adjustment, I have provided a series of holes 118, 118 in the camera track 98. In have also provided holes in the infinity stop blocks 100, 100 for the pins 119, 119. Assuming that the infinity stops are positioned for a short focal-length lens, as, for example, a five inch focal-length lens, then the parts will be positioned as in Fig. 7, and the index pointer 85 would be in the position that is shown in Fig. 7 with respect to the scale 86. In order to change to a longer focal-length lens, as, for example, one of six inch focal length, the locking screws 120, 120 would be loosened, and the pins 119, 119 withdrawn. The infinity stops would then be moved to the position shown in Fig. 11, in which case holes in the infinity stops 100, 100 would coincide with the holes 118, 118 in track 98. The pins 119, 119 would then be inserted by the operator and the locking screws 120, 120 be tightened, clamping the infinity stops 100, 100 in position, and the camera front 101 would then be moved out to such position, so as to be in the correct infinity position. The index pointer 85 of the disk or dial 83 would then be moved into the position on scale 86 that is shown in Fig. 11, which corresponds to the requirements for a six foot lens. The range finder would then be properly adjusted to track with a lens of six inch focal length. Any number of holes 118, 118 may be provided along the camera track 98 for adjusting to any other desired focal length of lens.

When a lens of a different focal length is used, a different set of scales 114 and 115 is necessary. When the camera is adapted for quick changing from one lens to another, it is sometimes desirable to provide two or more sets of scales, depending on the number of lenses used. In Fig. 11, I have shown a scale adapted to a six inch lens. In Fig. 7, I have shown a scale adapted to a five inch lens. The scale is in no way a part of the range finder structure and the range finder can be used, and normally is used, without reference to the scales. However, it is advantageous to provide the camera with scales giving a ready means of checking the range finder at any time. The scale 115 here shown is suitable for use with all lenses, and hence only the scale 114 need be changed. This change can be readily accomplished by removing the screws 116, 116 and substituting another scale particularly adapted to the lens of other focal length that is to be substituted. However, if desired, a second set of scales can be provided so that it will not be necessary to change the scales when changing the lenses, and in such case one set of scales is desirably mounted on the right side of the camera and the second set of scales on the left side of the camera.

When changing lenses, it also is necessary to change the size of opening provided in front of the lens 34. This is done in the present invention, as shown in Figs. 5 and 8, through the provision of masks 121 that slide into a slot of the lens escutcheon or cap-plate 122 held to the range-finder housing by means of screws 123, 123. It is necessary to provide a different mask for each lens of different focal length, so as to change the angle of view of the view finder to correspond with the angle of view of the objective lens used.

The combination range and view finder herein disclosed is the result of long experimentation and development for the purpose of overcoming the various objections and defects in range finders heretofore provided. It will be apparent to those who are schooled in the photographic art that I have provided a range finder having mechanism that is very rugged and which will withstand a great deal of hard usage without in any way impairing its efficiency in operation. By my invention, I have also provided a range finder particularly adapted for installation on cameras of a wide variety of design, with a minimum of change in the camera itself. The construction is such that the range finder is correctly positioned for ease of operation and in no way interferes with any of the normal operations of the camera.

While there have heretofore been provided a great number of range finders for use on cameras and also numerous view finders, I believe I am the first to produce a combination range and view finder that is wholly satisfactory, that can be readily adjusted for lenses of various lengths, and can also be readily adjusted to correct for parallax between the view finder and the camera objective lens.

Referring briefly to the train of parts that participate in compensating for the different ratios of movement of the camera track 98 consequent upon using different focal length lenses and the carrying out of the range finder function in focusing, it is noted that when a different focal length lens is substituted, the disk or dial 83 with its arm 84 is turned in one direction or the other to the proper extent, according to the focal length of the substituted lens. This movement causes pin 81 in slot 80 to swing the link or member 69 to the right or left. The focusing movement in or out of the camera track 98 will cause the pin 110 to move the arm 111, and turn slightly the shaft 72, with its crank arm 70, and this imparts lengthwise movement to the link or member 69. Such lengthwise movement of link or member 69 will rock bell-crank lever 58 and tilt the mirror frame 45 on the ball bearings 56, in the range-finding function. The extent of rocking movement of the bell-crank lever 58 will be in accordance with the focal length of the substituted lens, inasmuch as the leverage of the lever arm 64 was properly changed as described to compensate for such substituted focal length lens.

Having thus described one illustrative embodiment of the invention, it is to be understood that although specific terms are employed, they are used in a generic and descriptive sense and not for purposes of limitation, the scope of the invention being set forth in the following claims.

I claim:

1. A combination view and range finder for use in cameras and the like having a totally reflecting mirror of the first-surface type and also having a cooperating glass plate, a small, solid area only of the surface of which glass plate is coated to form a semi-transparent mirror, the remainder of the surface of said glass plate being uncoated, a negative lens 38 interposed in the path of the light beam between said totally reflecting mirror and said glass plate, said combined range and view finder having a negative lens 34 constituting the view finding lens, and through which as a view finder pass rays of light from the object to be photographed, a clear glass viewing window 75 in line with said totally reflecting mirror, and a positive lens in line with said negative viewing lens 34, whereby practically all the light passing through said negative lens 34, constituting the view finder, reaches said positive lens excepting for the said small coated area portion of said glass plate, thus providing an image of great brilliancy for view finding and for range finding.

2. A combination according to claim 1, in which one of the optical elements is movably mounted, and is coupled with the camera-focusing means so as to function in the range finding operation.

3. A combination according to claim 1, in which the said totally reflecting mirror is movably mounted, and is coupled with the camera focusing means so as to function in the range finding operation.

4. A combination according to claim 1 in which adjacent to the said positive lens is attached to the said combination view and range finder a diaphragm having an offset opening for correcting for parallax.

5. A combination according to claim 1, in which the said totally reflecting mirror is pivotally mounted, and means is provided, coupled with the camera-focusing means for moving said mirror upon its pivot in the functioning of the range finder.

6. A combination according to claim 1, in which the said totally reflecting mirror is pivotally mounted for movement in the functioning of the range finder, there also being provided means coupling said mirror with the camera track, and also means for compensating the movement of the coupling means in accordance with the focal length of the objective lens.

7. A range finder for use in cameras, having a track movable in and out in the focusing action, formed structurally as a unit with the casing of the camera, said range finder having a group of optical elements including two mirrors whereof one is rockable in the functioning of the range finder, and adjusting means to cause the range finder to track with objective lenses of different focal length, said adjusting means including a lever having an arm to engage directly the support for the movable mirror to move the same in the functioning of the range finder, a second lever arm operatively connected with said first arm, a motion-transmitting link-like member by which the focusing movement of the said track is transmitted to said first mentioned lever, said link-like member engaging for operation said second lever arm and movable therealong to change the leverage of said second lever arm, and dial means operatively connected to said link-like member, to move the same along said second lever arm to an extent according with the focal length of the objective lens.

8. A range finder for use in cameras, having a track movable in and out in the focusing action, formed structurally as a unit with the casing of the camera, said range finder having a group of optical elements whereof one is movable in the functioning of the range finder, the movable optical element being a pivoted mirror, a lever having an arm at the rear face of said mirror to move the same, a second lever arm operatively connected with the first, a motion-transmitting link-like member by which the focusing movement of the said track is transmitted to said first mentioned lever, said link-like member engaging for operation said second lever arm and movable therealong to change the leverage of said second lever arm, and dial means operatively connected to said link-like member, to move the same along said second lever arm to an extent according with the focal length of the objective lens.

9. A range finder for use in cameras, having a track movable in and out in the focusing action, formed structurally as a unit with the casing of the camera, said range finder having a group of optical elements whereof one is movable in the functioning of the range finder, the movable optical element being a pivoted mirror, a lever having an arm at the rear face of said mirror to move the same, a second lever arm operatively connected with the first, a motion-transmitting link-like member by which the focusing movement of the said track is transmitted to said first mentioned lever, said link-like member engaging for operation said second lever arm and movable therealong to change the leverage of said second lever arm, and dial means operatively connected to said link-like member, to move the same along said second lever arm to an extent according with the focal length of the objective lens, and means coupling said motion-transmitting link-like member with the focusing means for the objective lens of the camera.

10. A range finder for use in cameras, having a track movable in and out in the focusing action, formed structurally as a unit with the casing of the camera, said range finder having a group of optical elements whereof one is movable in the functioning of the range finder, the movable optical element being a pivoted mirror, a lever having an arm at the rear face of said mirror to move the same, a second lever arm operatively connected with the first, a motion-transmitting link-like member by which the focusing movement of the said track is transmitted to said first mentioned lever, said link-like member engaging for operation said second lever arm and movable therealong to change the leverage of said second lever arm, in accordance with the requirement of the focal length of the objective lens, and means coupling said motion-transmitting link-like member with the focusing means for the camera.

11. A range finder for use in cameras, having a track movable in and out in the focusing action, formed structurally as a unit with the casing of the camera, said range finder having a group of optical elements whereof one is movable in the functioning of the range finder, the movable optical element being a pivoted mirror, a lever having an arm at the rear face of said mirror to move the same, a second lever arm operatively connected with the first, a motion-transmitting link-like member by which the focusing movement of the said track is transmitted to said first mentioned lever, said link-like member engaging for operation said second lever arm and movable therealong to change the leverage of said second lever arm, in accordance with the requirement of the focal length of the objective lens, and means coupling said motion-transmitting link-like member with the focusing means for the camera, said coupling means including the said camera track, a pin 110 thereon, and an arm 111 engaging said pin and operatively connected with the support for the said link-like member.

12. In an optical group for range finders to be used in cameras, a totally reflecting rockable mirror of the first-surface type, a support plate for said mirror, ball bearings interposed between an end portion of said support plate and the basal support for the mirror, and constituting a pivot for said mirror and its support plate, and a spring engaging said support plate and tending to rock said support plate upon said ball bearings.

13. In an optical group for range finders to be used in cameras, a totally reflecting mirror of the first-surface type, a support plate for said mirror, ball bearings interposed between an end portion of said support and the basal support for the mirror, and constituting a pivot for said mirror and its support plate, and means tending to rock said support plate upon said ball bearings as a pivot.

14. In an optical group for range finders to be used in cameras, a totally reflecting mirror of the first-surface type, said mirror being mounted for rocking movement, a member to engage the mirror support to rock the same, means coupled to the focusing means of the camera and engaging of the camera, and a supported spring 53 havquently said mirror in correlation with the focusing of the camera, and a supported spring 53 having spring arms 53a and 53b, the former engaging the mirror support so as to tend to rock said mirror upon its mounting and the latter engaging the said member and tending to stress the same away from said mirror.

15. In an optical group for range finders to be used in cameras, a totally reflecting mirror of the first-surface type, said mirror being mounted for rocking movement, a member to engage the mirror support to rock the same, means coupled to the focusing means of the camera and engaging said member to move the same and consequently said mirror in correlation with the focusing of the camera, and a spring 53 having spring arms 53a and 53b, the former engaging the mirror support and the latter engaging the said member, said spring 53 having an intermediate coiled portion with means to support the spring thereat, and the said arms respectively tending to tilt the mirror upon its mounting and to move said member away from the mirror support.

16. In an optical group for range finders to be used in cameras, a totally reflecting mirror of the first-surface type, said mirror having a rockable support plate 45, a bell-crank lever 58 having an arm engaging the rear face of said support plate, means coupled to the focusing means of the camera and having an operating engagement with another arm of the bell-crank lever, to move the same in correlation with the focusing of the camera, and a supported spring 53 having an arm to engage said bell-crank lever and tending to stress the said lever away from said mirror, and having another arm to engage said mirror support plate so as to tend to rock said support plate 45.

17. In an optical group for range finders to be used in cameras, a totally reflecting mirror of the first-surface type, said totally reflecting mirror having a pivoted support plate 45, a bell-crank lever 58 having an arm to engage the rear face of said mirror support plate and having another arm coupled with the focusing means of the camera, and spring means in engagement with said first arm of the bell-crank lever and tending to move said arm away from the said mirror support plate 45.

18. A range finder for use in cameras, having a track movable in and out in the focusing action, formed structurally as a unit with the casing of the camera, said range finder having a group of optical elements whereof one is movable in the functioning of the range finder, and adjusting means to cause the range finder to track with objective lenses of different focal length, said adjusting means including a bell-crank lever having an arm to engage operatively said movable element to move the same, a motion-transmitting link by which the focusing movement of said track is transmitting to said movable optical element, said link engaging an edge of the other arm of said bell-crank lever and movable along said edge for varying the leverage of said arm, said link having a slot, a dial disk having an arm provided with a formation entering said slot, a short shaft mounted in the camera casing and having a crank arm connected to said link, an arm 111 pivoted on said shaft, the said movable camera track supporting the objective lens and having a member to engage said arm 111.

19. Focusing mechanism for cameras for determining the position of the objective lens thereof, so that it shall focus on the plate or film of the camera objects at varying distances from the objective lens, including a camera casing having a bed, a camera track adjustable therealong, an objective lens, a support therefor movable along said camera track, said objective lens being interchangeable with others of different focal length, a range finder attached to the camera casing so as to be a part of the camera structure and having optical elements at least one whereof is movable, and operating connections between said movable optical element and the camera track including a lever positioned to engage the support for said movable optical element, a motion-transmitting link engaging said lever and adjustable along an arm thereof to vary the effective leverage thereof, dial means having indications for lenses of different focal length, and connections from said dial means to said motion-transmitting link.

20. A range finder for use in cameras, having a track movable in and out in the focusing action, formed structurally as a unit with the casing of the camera, there being a housing for said range finder on top of said camera casing, said range finder having a group of optical elements whereof one is movable in the functioning of the range finder, and adjusting means to cause the range finder to track with objective lenses of different focal length, said adjusting means including a lever having a first arm to engage operatively said movable element to move the same, and having a second lever arm connected with said first arm to partake of the movements thereof, a member transmitting motion from the camera track in the focusing movement thereof and engaging said second lever arm and movable therealong to change the leverage of said second arm, and dial means operatively connected to said member to move the same along said second lever arm to an extent according with the focal length of the objective lens, said dial means being mounted upon an exposed part of said range finder housing.

21. In an optical group of range finders to be used in cameras, a totally reflecting rockable mirror of the first-surface type, a support plate for said mirror, said support plate being pivotally mounted upon a stationary part of the range finder structure, and means linked to the support for the objective lens of the camera and directly engaging in a pushing relation but unconnected to the said support plate to move the latter upon its said pivot by such pushing action, the pivotal mounting of the said mirror support plate being a ball bearing.

22. A camera having a combined view and range finder with parallax correcting means, all formed structurally as a unit with the casing of said camera and provided for that purpose with a housing, said housing having mounted directly in a wall thereof a group of optical elements and also containing means to correct for parallax between the view finder and the camera objective lens, said means to correct for parallax including a telescoping barrel which is directly mounted in a wall of said housing having a positive lens and a diaphragm with an offset opening, said barrel being rotatable in said housing to accord with different sighting positions.

23. A combination according to claim 22, but in which the means for correcting the parallax is functionally in line with the view finder lens, and includes a tubular member supported in the said housing with means to hold said tubular member in retracted position in the housing and also in functioning position projected outwardly from the housing.

24. A combination according to claim 22, but in which the means for correcting for parallax includes a tubular member with means to hold it in either retracted or projected position with relation to the housing, and also in positions of desired circumferential adjustment when correcting for parallax.

25. A combination according to claim 22, but in which the means for correcting for parallax, and which is functionally in line with the view finder lens, is a barrel 25 supported in the housing and having a spring 28 tending normally to project said barrel outward into viewing position, said barrel having adjacent its outer end an encircling groove and also having a series of spaced, lengthwise extending grooves and having means adapted to engage said respective grooves to hold the said barrel in retracted position or in projected functioning position.

26. A range finder for use in cameras, having a track movable in and out in the focusing action, formed structurally as a unit with the casing of the camera, said range finder having a group of optical elements including two mirrors whereof one mirror is rockable in the functioning of the range finder, and adjusting means to cause the range finder to track with objective lenses of different focal length, said adjusting means including a bell crank lever having a first arm operatively related to the support for said rockable mirror so as to rock the mirror and having a second arm, a motion-transmitting member operatively connected to the camera track to be moved in the focusing movement of said camera track and to transmit such movement to said rockable mirror, said member engaging said second lever arm, and movable therealong to change the leverage of said second arm, and dial means operatively connected to said member to move the same along said second arm to an extent according with the focal length of the objective lens.

27. A combination according to claim 26, but in which said first arm of the bell crank lever directly engages the mirror support to rock said mirror.

28. A combination according to claim 26, but in which the member engaging and movable along said second lever arm is a link and the said dial means engages the said link to move said link along said second lever arm.

29. A combination according to claim 26, but in which the member engaging and movable along said second lever arm is a link, and in which said dial means is operatively connected to said link to move the same along said second arm to an extent according with the full length of the objective lens, and in which combination a movable camera track is provided with a formation and a member is mounted upon the camera structure to be moved by said formation on the camera track in the in and out movements of said camera track, and in which combination said member is operatively connected to said link, so that said link is moved in accordance with the movements of the camera track.

30. A range finder for use in cameras, having a track movable in and out in the focusing action, formed structurally as a unit with the casing of the camera, said range finder having a group of optical elements including two mirrors, whereof one mirror is rockable in the functioning of the range finder, and adjusting means to cause the range finder to track with objective lenses of different focal length, said adjusting means including a bell crank lever having a first arm operatively related to the support for said rockable mirror so as to rock the mirror and having a second arm, a motion-transmitting member operatively connected to the camera track to be moved in the focusing movement of said camera track and to transmit such movement to said rockable mirror, said member engaging said second lever arm, and movable therealong to change the leverage of said second arm, dial means operatively connected to said member to move the same along said second arm to an extent according with the focal length of the objective lens, a movable camera track provided with the camera body and having a pin-like formation, a pivoted arm engaged by said pin-like formation, and means connecting said pivoted arm and said member that is movable along said second lever arm, so that said member is moved in accordance with the movements of the camera track.

31. A combination according to claim 30, but in which the said first arm of the bell crank lever directly engages the support for the rockable mirror to rock the mirror in the functioning of the range finder.

32. A combination view and range finder for use in cameras and the like having a totally reflecting mirror of the first-surface type and also having a cooperating glass plate, a small, solid area only of the surface of which glass plate is coated to form a semitransparent mirror, the remainder of the surface of said glass plate being uncoated, and a negative lens 38 interposed between the said totally reflecting mirror and the said glass plate, the said totally reflecting mirror being adjustable in the range-finding functioning operation.

OSCAR STEINER.

CERTIFICATE OF CORRECTION.

Patent No. 2,302,584.  November 17, 1942.

OSCAR STEINER.

It is hereby certified that error appears in the printed specification of the above numbered patent requiring correction as follows: Page 7, second column, line 34, claim 14, for "of the camera, and a supported spring 53 hav-" read --said member to move the same and conse- --; and that the said Letters Patent should be read with this correction therein that the same may conform to the record of the case in the Patent Office.

Signed and sealed this 29th day of December, A. D. 1942.

(Seal)

Henry Van Arsdale,
Acting Commissioner of Patents.